Nov. 10, 1953 D. D. GRIEG ET AL 2,659,049

ELECTRICAL SIGNAL TRANSLATING SYSTEM

Filed Jan. 9, 1953 2 Sheets-Sheet 1

INVENTORS
DONALD D. GRIEG
ARNOLD M. LEVINE
CHARLES L. ESTES

BY [signature]
ATTORNEY

ELECTRICAL SIGNAL TRANSLATING SYSTEM

Filed Jan. 9, 1953

2 Sheets-Sheet 2

INVENTORS
DONALD D. GRIEG
ARNOLD M. LEVINE
CHARLES L. ESTES
BY [signature]
ATTORNEY Patented Nov. 10, 1953

2,659,049

UNITED STATES PATENT OFFICE 2,659,049

ELECTRICAL SIGNAL TRANSLATING SYSTEM

Donald D. Grieg, North Caldwell, and Arnold M. Levine, River Edge, N. J., and Charles L. Estes, Scottsdale, Ariz., assignors to Federal Telecommunication Laboratories, Inc., Nutley, N. J., a corporation of Delaware Application January 9, 1953, Serial No. 330,571

15 Claims. (Cl. 332—1)

This invention relates to an electrical signal translator and more particularly to a translating system for converting cyclic progression code (CP) to pulse code modulation (PCM) for transmission.

Heretofore, coded transmission has employed PCM code which is advantageous for decoding since each pulse has a different weight. A further advantage of PCM code is found in its transmission wherein advantages in signal-to-noise ratios may be achieved. However, PCM code has a serious disadvantage from the standpoint of the encoding operation. If the input signal should fall between two distinct signal levels, a spurious output may result which would produce a code signal in error by several signal levels. In order to prevent such errors, the signal must be quantized so that it is near the center of the step or element representing the desired code. This error may be prevented by employing a coding tube which accomplishes the desired result with the quantizing grid and associated circuitry of considerable complexity. In accordance with the invention herein described, the so-called cyclic progression or CP code obviates this difficulty of encoding by allowing only one pulse to change between code signal levels.

To retain the advantages of the CP code for the process of encoding as well as the transmission characteristics and decoding characteristics of the PCM code it is desirable to provide a means to translate the CP code into PCM code prior to application of the coded signal to the R. F. equipment for transmission to a distant receiver. It has been the practice in the past to accomplish the translation from CP to PCM code by means of flip-flop circuits. While these flip-flop circuits have been found successful for low speed operation they are not conventionally applicable to high speed operation and, therefore, offer serious difficulties when wideband PCM is employed, such as is required for transmission of many telephone channels by frequency division multiplex and television.

It is therefore an object of this invention to provide an electrical signal translator which is capable of high speed translation from code signals of one type to code signals of another type.

Another object of this invention is the elimination of flip-flop circuits to achieve the translation from a cyclic permutation code; this being accomplished by substituting a reflecting transmission line to produce an intermediate code comprising both positive and negative polarity pulses which may be judiciously translated into a PCM code.

A feature of this invention is the provision of a reflecting transmission line associated with a CP code input having a length of one-half a baud. Under the action of the CP code multiple reflections of alternating signs result to produce an intermediate code of the positive and negative polarity and varying amplitudes depending upon the CP code pulses applied to said transmission line and the polarity of the reflected pulses developed by a preceding digit pulse.

Another feature of this invention is the incorporation of a means to derive a code signal from said intermediate code of like polarity and the same varying amplitude. From this code signal with the aid of a differential amplifier and double amplitude pulses of corresponding time from a timing generator, a coded signal is produced wherein double amplitude pulses of the code signal derived from said intermediate code signal is eliminated. The resulting output from said differential amplifier is passed through a second rectifier to produce the desired PCM output for application to R. F. equipment for modulation of the carrier signal emitting therefrom.

The above-mentioned and other features and objects of this invention will become more apparent by reference to the following description taken in conjunction with the accompanying drawings, in which.

Figure 1:
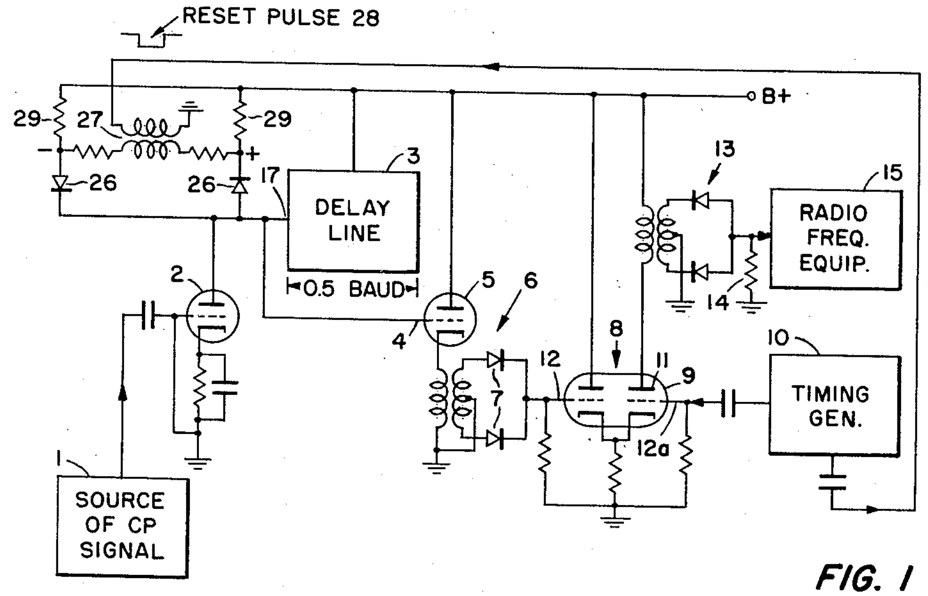
Fig. 1 is a schematic diagram of an embodiment of this invention.

Referring to Fig. 1, an embodiment of the translating system of this invention is shown to comprise a CP code signal source 1 which is fed into electron discharge device 2, the combination thereof constitutes a high impedance source for coupling the CP code to a generator means of shorted delay line 3 having a length of one-half baud. The termination of delay line 3 results in multiple reflections of alternate signs on delay line 3 when said delay line as activated by a digit pulse included in the CP code. The resultant output of delay line 3 is an intermediate code having both positive and negative digit pulses with varying amplitudes depending upon the addition of the reflected pulses on line 3 and the digit pulses arriving at the input of delay line 3. This intermediate code is coupled to the grid 4 of electron discharge device 5 which constitutes a portion of a full wave rectifier 6 wherein the arrangement of rectifiers 7 are such that positive polarity digit pulses are passed unchanged in polarity and amplitude while negative digit pulses are inverted in phase. The output of rectifier 6 is applied to mixer means or differential amplifier 8 comprising electron discharge device 9 of the double triode type, or possibly having two triode types substituted therefor, so arranged that doublet amplitude pulses of corresponding digit numbers from timing generator 10 subtract from the code derived from the intermediate code. This subtraction process provides at anode 11 unity amplitude pulses of both positive and negative polarity depending upon the amplitude of the digits presented to grid 12 of electron discharge device 9. The output at anode 11 is operated on by full wave rectifier 13 to invert negative polarity pulses thereby providing a series of digit pulses of posiitve polarity and unity amplitude which corresponds to the desired PCM code. This PCM code is coupled from load resistor 14 to the radio frequency equipment 15 for modulation of the carrier frequency emitting therefrom.

Figure 2:
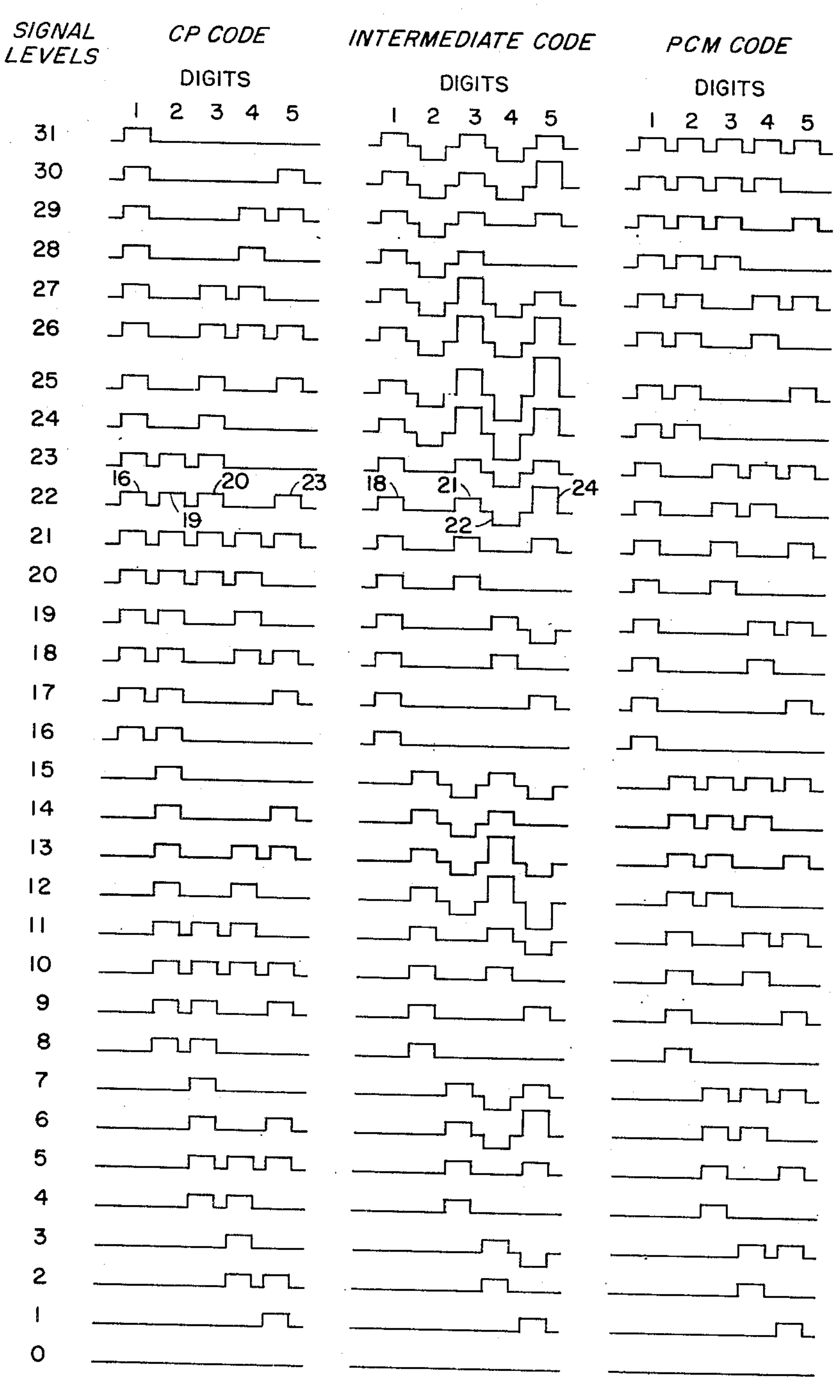
Fig. 2 is a graphical representation of the translation from CP code to PCM code aiding in the understanding of the principles of this invention.

Fig. 2 illustrates generally the digit pulses corresponding to the signal levels of a thirty-two signal level code system for the CP code, the intermediate code of this invention, and the corresponding desired PCM code for transmission and decoding. It will be recognized by comparison of the intermediate code with that of the PCM code that if double amplitude pulses of either sign are discarded that the binary PCM code results. The one triple amplitude pulse occurring at signal level twenty-five will be retained as a digit pulse. The formation of the intermediate code from the CP code by means of the reflecting delay line 3 will become clearer by referring to the codes illustrated for signal level twenty-two of Fig. 2 and the following description. With delay line 3 having a one-half baud length, a digit pulse of the CP code applied to the input end of delay line 3 will travel down the line and back again but with opposite polarity and will be present at the input end of the delay line by the time the digit pulse, if present, of the next digit position is applied to the input of delay line 3. Such a condition of negative reflected pulses and positive input digit pulses will cause a cancellation of pulses thereby removing a digit pulse from the CP code input.

With reference to the signal level twenty-two the first digit pulse 16 of the CP code will be present at the input 17 of delay line 3 and at the same time will be applied to grid 4 of electron discharge device 5 and is represented by pulse 18 in the intermediate code. By the time the second digit pulse 19 of the CP codes reaches the input 17 of delay line 3, the reflected equivalent of pulse 16 is also present at the input 17 thereby causing a cancellation of pulse 19, leaving a blank in the second digit of the intermediate code. The third digit pulse 20 applied to the input 17 be fed into delay line 3 and likewise to grid 4 as represented by pulse 21 of the intermediate code. Since the four digit position of the CP code is blank, the first reflection of pulse 20 will appear at grid 4 as represented by pulse 22 of the intermediate code. Pulse 22 will travel back down delay line 3, be reversed in polarity, and arrive at input 17 coincident with the arrival of the fifth digit pulse 23 such that an addition of reflected and input pulses take place to produce the fifth digit pulse 24 of the intermediate code. The remaining signal levels of the CP code are translated into the intermediate code by delay line 3 in a manner substantially as described hereinabove resulting in the intermediate codes as illustrated in Fig. 2

Figure 3:
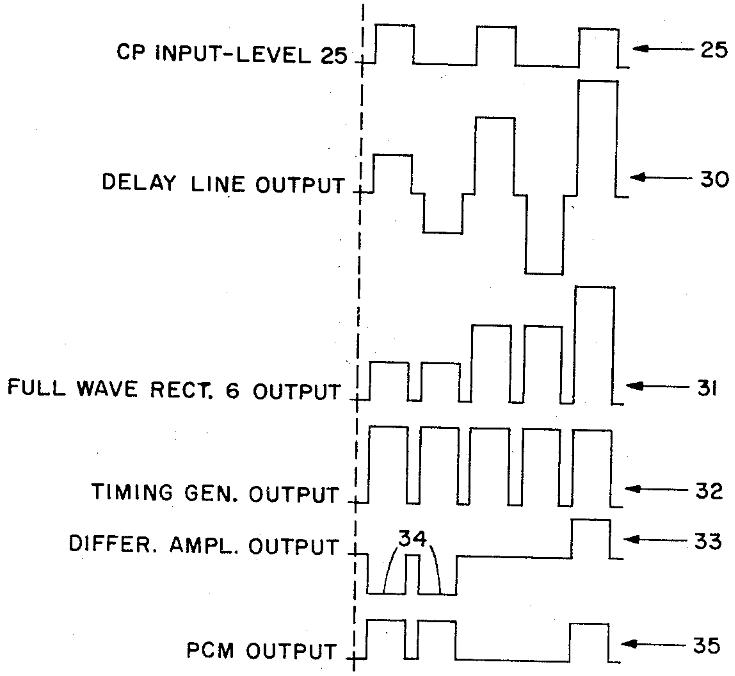
Fig. 3 is a grapical representation of the steps of translation indicating the signal waveform at various points in the circuit of Fig. 1 for a particular signal level.

Turning now to a specific example for tracing the operation of the circuit of Fig. 1 reference should be had to Fig. 3 wherein the waveforms of signal level twenty-five for a CP input is traced from point-to-point throughout the circuit. The CP input for signal level twenty-five is shown by the pulses of curve 25 and occurs at the output of source 1 for application to the electron discharge device 2 shown herein to be a triode type electron discharge device for simplicity of the drawings, but is preferably a pentode type device to achieve a desired high impedance input to delay line 3. The anode circuit of electron discharge device 2 includes rectifiers 26 which are normally biased off by pulse 28 applied to transformer 27 from a portion of the timing generator 10. After a particular CP code group has been transformed into a resulting intermediate code, the reset pulse 28 is removed from transformer 27 to discharge the energy on the delay line through the load impedances 29 thereby clearing delay line 3 for application of the succeeding CP code group.

The output of delay line 23, shown in curve 30, is applied to the grid 4 of electron discharge device 5 wherein the operation of the full wave rectifier 6 produces an output as shown in curve 31. Comparison of curve 31 with curve 30 shows that the negative pulses of curve 30 are inverted in polarity to produce a digit train of pulses of positive polarity unchanged in amplitude. The digit pulses of curve 31, as derived from the intermediate code of curve 30, are then applied to grid 12 of the differential amplifier 8 wherein the amplitudes of the digit pulses of curve 31 have subtracted therefrom the double amplitude pulses of curve 32 applied from timing generator 10 to grid 12a of device 9. The output at anode 11 as illustrated in curve 33 is the subtractive residue following the operation of amplifier 8. Applying the pulses of curve 33 to the full wave rectifier 13 in the anode circuit of the differential amplifier 8, the negative pulses 34 are inverted in polarity to produce the desired PCM output for signal level twenty-five as illustrated in curve 35. The resulting PCM output is then coupled to radio frequency equipment 15 wherein the carrier frequency is modulated in accordance with the code represented in curve 35.

While we have described above the principles of our invention in connection with specific apparatus, it is to be clearly understood that this description is made only by way of example and not as a limitation to the scope of our invention as set forth in the objects thereof and in the accompanying claims.

We claim:

1. An electrical signal translating system comprising a source of code signals of a given type including a plurality of time sequence pulse code groups means coupled to said source for producing an intermediate code signal having digit pulses of varying amplitudes dependent upon the pulse positions of an input pulse code signal, a timing generator for producing pulses of a given amplitude, mixer means coupled to the output of the intermediate signal producing means and said timing generator for combining algebraically the pulses therefrom, whereby the output of said mixer means comprises code signals of a second type corresponding to the intelligence of the code signal of said first type.

2. A system according to claim 1, wherein the intermediate code signal producing means includes a delay line shorted at one end and of such a length that the pulse input from said source and the reflected pulses from said shorted end produce said intermediate code signal.

3. A system according to claim 2, wherein said intermediate code signal producing means further includes rectifier means associated with said delay line to produce an output pulse grouping wherein the pulses are of the same polarity.

4. A system according to claim 2, wherein said intermediate code signal producing means further includes a reset circuit for discharging said delay line at the termination of each pulse group, and said timing generator includes a pulse output connection for supplying a reset pulse for application to said reset circuit.

5. A system according to claim 1, wherein said mixer means includes an electron discharge device to which signals are applied from said intermediate code producing means and from said timing generator, and means for rectifying the output of said mixer means to produce a final pulse group of a given polarity.

6. An electrical signal translating system comprising a source of code signals of a given type including a plurality of time sequence pulse code groups, a timing generator producing pulses of a given amplitude, generator means coupled to said source of code signals to produce an intermediate code signal having both positive and negative digit pulses of varying amplitudes dependent upon the pulse positions of an input code signal, a first rectifying means associated with said generator means to resolve the pulses of said intermediate code signal into pulses of identical polarity, mixer means associated with said first rectifying means and said timing generator to subtract the pulses of given amplitude from the pulses of said intermediate code signal, and a second rectifying means associated with the output of said mixer means to deliver a code signal of a second type corresponding to the intelligence of code signal of said first type.

7. A system according to claim 6, wherein said generator means comprises a reflecting transmission line of predetermined length and a means to discharge said transmission line through its load impedance following the occurrence of a code group signal to ready said transmission line for the succeeding code group signal.

8. A system according to claim 7, wherein said transmission line comprises a shorted delay line one-half baud in length.

9. A system according to claim 7, wherein said means to discharge said transmission line comprises a pair of rectifiers and a transformer having a secondary winding associated with said load impedance and a primary winding associated with a reset pulse output of said timing generator, said secondary winding, said rectifiers and said load impedance being arranged to bias off said rectifiers during the period that a particular code group signal is being presented to said transmission line.

10. A system according to claim 6, wherein said generating means comprises a shorted delay line one-half baud in length and a means to discharge said delay line including a pair of rectifiers and a transformer associated with the load impedance of said delay line and a coupling for applying a reset pulse from said timing generator to the primary of said transformer, the secondary winding of said transformer, said rectifiers and said load impedance being arranged to discharge said delay line following the occurrence of a code group signal to reset said delay line for succeeding code group signal.

11. A system according to claim 6, wherein said first rectifying means comprises an electron discharge device having at least a cathode, an anode and a control grid, a transformer associated with said cathode, and a pair of rectifiers associated with said transformer to form a full wave rectifier so arranged that negative polarity digit pulses are inverted in polarity.

12. A system according to claim 6, wherein said mixer means includes a differential amplifier.

13. A system according to claim 12, wherein said differential amplifier comprises a pair of electron discharge devices having a common cathode connection such that the double amplitude pulse from said timing generator is subtracted from the digit pulses of said derived code signal with the subtractive residue being removed from the anode of one of said pair of electron discharge devices.

14. A system according to claim 13, wherein said second rectifying means comprises a transformer associated with said output anode and a pair of rectifiers arranged in conjunction with said transformer to invert negative polarity pulses of said subtractive residue thereby forming the desired PCM signal from said derived code signal.

15. A system according to claim 6, wherein the code signals of said first type are cyclic progression code signals and the code signals of said second type are pulse code modulated signals.

DONALD D. GRIEG.
ARNOLD M. LEVINE.
CHARLES L. ESTES.

No references cited.